United States Patent
Camp

[11] 3,775,589
[45] Nov. 27, 1973

[54] STEAM GENERATOR WITH ELECTRICALLY HEATED BOILING CHAMBER

[76] Inventor: Nat Camp, 395 Westchester Ave., Portchester, N.Y.

[22] Filed: Dec. 24, 1970

[21] Appl. No.: 101,309

Related U.S. Application Data

[63] Continuation-in-part of Ser. No. 11,986, Feb. 17, 1970, Pat. No. 3,619,559.

[52] U.S. Cl. ............ 219/284, 21/119, 128/192, 219/273, 219/275, 219/288, 239/136
[51] Int. Cl. ............ H05b 3/60, F22b 1/30
[58] Field of Search .......... 219/284–295, 271–276, 219/307–309; 21/117–119; 128/186, 192; 239/135, 136

[56] References Cited
UNITED STATES PATENTS

| | | | |
|---|---|---|---|
| 1,328,069 | 1/1920 | Young | 219/290 |
| 2,576,110 | 11/1951 | Fisher | 219/273 X |
| 2,400,618 | 5/1946 | Wicks | 219/291 |
| 3,299,252 | 1/1967 | Meek | 219/289 X |
| 2,588,314 | 3/1952 | Wicks | 219/295 UX |
| 3,267,678 | 8/1966 | Camp | 219/271 UX |
| 2,453,455 | 11/1948 | Persak | 219/273 UX |
| 2,443,417 | 6/1948 | Duncan | 219/276 X |
| 3,619,559 | 11/1971 | Camp | 219/288 |

FOREIGN PATENTS OR APPLICATIONS

| | | | |
|---|---|---|---|
| 530,033 | 7/1955 | Italy | 219/273 |
| 241,130 | 10/1962 | Australia | 219/288 |

Primary Examiner—A. Bartis
Attorney—Karl F. Ross

[57] ABSTRACT

An electrically heated steam generator is provided with a heating chamber having a water inlet and a steam outlet. A water reservoir is connected to the water inlet by a capillary conduit of polytetraflouroethylene (Teflon) whereby water is supplied to the chamber at a controlled rate consistent with the rate of steam discharge through the outlet. A pair of spaced electrodes are suspended within the heating chamber for heating the water therein. The capillary conduit has a bore of a maximum diameter of substantially ⅛ inch and a length corresponding to a minimum resistance on the order of $10^5$ ohms in the column of water within the bore, whereby leakage current between the heating chamber and reservoir is reduced to about 1 m A or less with a supply voltage of 110 V. applied to the electrodes.

3 Claims, 3 Drawing Figures

PATENTED NOV 27 1973   3,775,589

Nat Camp
INVENTOR.

BY

Karl F. Ross
Attorney

STEAM GENERATOR WITH ELECTRICALLY HEATED BOILING CHAMBER

This application is a continuation-in-part of my prior application Ser. No. 11,986 filed Feb. 17, 1970, now U.S. Pat. No. 3,619,559.

My present invention relates to a steam generator of the general type described in my prior U.S. Pat. No. 3,267,678, i.e. a vapor-generating device wherein water from a relatively large body in a storage tank or the like is electrically heated in a relatively small boiling chamber, the evaporating liquid being continuously replenished by way of a capillary tube connecting an inlet of the boiling chamber to the supply tank.

As disclosed in my aforementioned application and U.S. Pat. No. 3,619,559, the boiling chamber of such a system may be an upright vessel equipped with a pair of spaced-apart electrodes which are partly immersed in the water present therein, each electrode advantageously having an enlarged lower portion so that a rising water level in, say, the lower third of that chamber results in a relatively rapid enlargement of the effective electrode surface whereas a similar rise beyond a predetermined point results in no appreciable increase in the immmersed electrode area and therefore in the current flow.

With a pair of such electrodes I am able to control the water level within the lower part of the chamber inasmuch as any rise of that level along the immersed conductive elements results in a rapid increase in the effective electrode area with a consequent rise in heating current and greater vaporization rate; if, upon a lowering of the back pressure due to an enlargement of the effective chamber outlet, liquid enters the chamber more rapidly through the capillary inlet tube, the rise in water level sharply increases the magnitude of the heating current so as to restore the balance.

Once the liquid has reached the upper boundary of the main electrode portions, a further rise in water level entrains only a relatively slight increase in heating current, or none at all if the exposed electrode surface does not rise above the middle region of the chamber, so that the power supply will not be overloaded even if the chamber is completely filled when the circuit is closed. In that event the level gradually drops back, at a rate depending upon the width of the nozzle orifice, until the aforedescribed balance is attained.

While such a system operates satisfactorily to provide the necessary vapor pressure in a steam generator whose boiling chamber has an outlet formed by one or more nozzles of widely varying diameter, problems may arise from the flow of an appreciable leakage current from the boiling chamber to the main reservoir by way of the capillary tube and the water column contained therein. If this leakage current becomes excessive, it not only represents a significant loss in operating energy but also may cause unpleasant electric shocks to a person coming into contact with the water in the reservoir.

The object of my present invention, therefore, is to provide an improved steam generator of the type set forth in which the magnitude of such leakage current flowing into the reservoir water is minimized and the danger of electric shocks is virtually eliminated.

I have found, in accordance with the present invention, that the realization of this object requires:

a. the construction of the capillary tube from dielectric material, advantageously a synthetic resin, and b. certain restrictions upon the dimensions of this capillary conduit, i.e. a maximum inner diameter of a few millimeters and a minimum length of several centimeters.

More specifically, the dimensions of the capillary conduit should be such as to result in an effective resistance of the water column on the order of at least $10^5$ ohms which, with the usual supply voltage of 110V, limits the leakage current to approximately 1 milliampere or less. In practice, the magnitude of this leakage current will vary not only as a function of temperature, with greater heating resulting in increased conductivity, but also upon a backflow of liquid from the boiling chamber through the capillary toward the reservoir in response to an increase in back pressure due to a restriction of the outlet orifice, such a backflow transferring some of the more highly ionized electrolytic fluid from that chamber to the narrow conduit with a consequent lowering of its effective resistance. Pursuant to a further feature of my invention, I have determined that the effect of this backflow upon the leakage current can be minimized if the length of the capillary conduit is at least 2 inches, or about 5 cm, and if the diameter of the capillary bore equals not more than ⅛ inch, or about 3 mm. These dimensions are virtually independent of the dielectric used for the capillary, yet I prefer to employ resinous materials of low surface tension and high thermal stability such as polytetrafluoroethylene (Teflon). The low surface tension insures a satisfactory supply of fresh water from the reservoir to the boiling chamber with narrow water columns required for electrolytic insulation.

The above and other features of my invention will be described in detail hereinafter with reference to the accompanying drawing in which.

Figure 1:
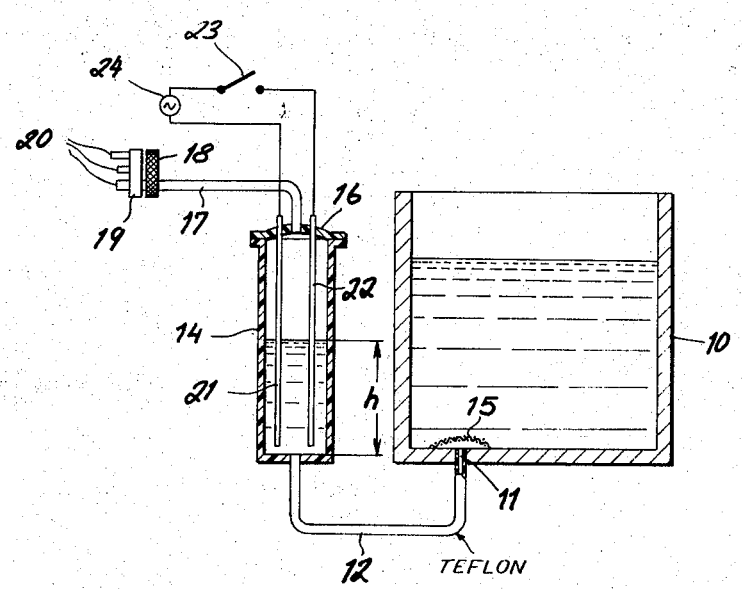
FIG. 1 is a somewhat diagrammatic sectional view of a steam generator as disclosed in my above-identified prior application.

In FIG. 1 I have illustrated a steam generator comprising a liquid reservoir in the form of a tank 10 having a drain 11 connected via a capillary tube 12 to an inlet 13 of an upright boiling chamber 14. A strainer 15 overlies the drain 11 to keep impurities away from the tube 12. Chamber 14 has a top 16 in the form of a detachable lid from which an outlet tube 17 leads to a head 18 carrying a turret 19 with a set of nozzles 20 of different orifice sizes. Turret 19 may be rotated to align any one of the nozzles 20 with the outlet tube 17 in order to throttle the discharge of steam therefrom to a predetermined extent.

A pair of electrodes 21, 22 are suspended from lid 16, hanging down to almost the bottom of chamber 14 in spaced-apart, parallel relationship. These electrodes are connectable by way of a switch 23 across a source of operating voltage diagrammatically indicated at 24.

The water level in tank 10, whose volume greatly exceeds that of boiling chamber 14, is at or above the level in the chamber so as to create a sufficient hydrostatic pressure differential across capillary tube 12 to drive water into the chamber. With the twin electrodes 21, 22 energized, the steam generated in chamber 14 creates a back pressure whose magnitude depends upon the effective width of the selected nozzle 20. The amount of heating current passing between the electrodes 21 and 22 depends on the quantity of water bridging these electrodes and is therefore a function of the height $h$ of the liquid in chamber 14. Thus, the water level in the chamber during steady-state operation must be such that enough heat is generated to raise the temperature of the water bath above the boiling point (which varies somewhat with the back pressure of the steam), taking into account the constant influx of cold water from reservoir 10 to balance the rate of vapor discharge via the selected nozzle 20.

Boiling chamber 14 consists of a suitable heat-resistant insulating material, such as a phenolic resin.

Figure 2:
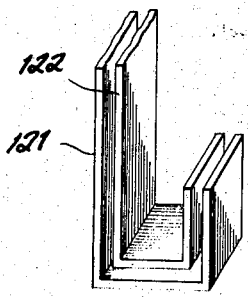
FIG. 2 is a perspective view of a pair of electrodes adapted to be used in the generator of FIG. 1.

While FIG. 1 shows a pair of flat, parallel electrodes 21 and 22, FIG. 2 illustrates a pair of generally J-shaped strips 121, 122 in nested position which may be used in their stead in the boiling chamber 14. In such a case, the water level in that chamber may vary along the shorter leg of the inner strip 122 to compensate for changes in back pressure due to substitution of one nozzle 20 for another.

The capillary tube 12, which in accordance with the present invention consists of a nonconductive and thermally stable material such as Teflon, galvanically insulates the chamber 14 from the reservoir 10 by being so dimensioned that the water column in that tube has a minimum resistance on the order of $10^5$ ohms, taking into account the increased conductivity of the water due to the presence of any salt that may have been dissolved in the liquid of the boiling chamber to enhance its electrolytic character. In practice, the resistivity of the electrolytic solution may range between roughly 100 and 1,000 ohm-cm, varying somewhat with bath temperature. Since the water flow in tube 12 will generally be in the forward direction, i.e. from tank 10 to chamber 14, the electrolytic solution in that tube will normally be much more diluted than in the boiling chamber. If, however, the turret 19 is rotated to shift from a larger to a smaller nozzle orifice, the sudden rise in back pressure at the outlet 18 may reverse the flow sufficiently to create a temporary state of high ionization within tube 12 with a resulting drop in the column resistance. It is to guard against objectionable surges of leakage current under such circumstances that the tube should also have a certain minimum length, preferably not less than about 5 cm or 2 inches, regardless of the width of its bore within the limits of its capillarity, i.e. with an inner tube diameter of not more than about 3 mm or ⅛ inch.

Tests conducted with a Teflon tube, and with an electrode assembly of the type illustrated in FIG. 2, drawing an average current of 4 amps when energized with 110 V, established the following relationships between tube dimensions and leakage current:

Inner Tube Diameter 1/16 inch

| Tube Length (inches) | Leakage Current (mA) |
| --- | --- |
| 2 | 1.1 |
| 1½ | 0.2 |
| 1 | 0.4 to 1 |
| ½ | 0.8 to 5 |

Inner Tube Diameter 1/8 inch

| Tube Length (inches) | Leakage Current (mA) |
| --- | --- |
| 2 | 0.5 to 1.1 |
| 1½ | 0.6 to 1.2 |
| 1 | 5 to 5.3 |
| ½ | 6 to 7 |

By way of comparison, the leakage current was also measured through a ¼ inch hole in the resinous wall (⅛ inch thick) of chamber 14 with omission of the capillary tube 12. This virtual electrolytic short circuit between the two vessels 10 and 14 resulted in a leakage current of 7½ to 10 mA.

With tubes of 1/16 inch inner diameter ranging in length between ½ inch and 1 inch, the leakage current is found to fluctuate within the aforestated ranges at a rate of about 1 cycle per minute. This fluctuation is considered due to an oscillation of the water level in the boiling chamber about its point of equilibrium.

Figure 3:
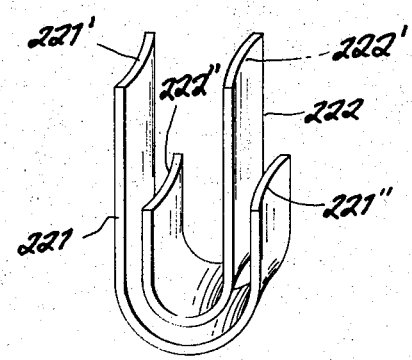
FIG. 3 is a view similar to FIG. 2, showing a modified electrode structure.

As shown in FIG. 3, J-shaped electrodes 221, 222 generally similar to those of FIG. 2 may be nested in a relatively inverted position to increase the spacing of their stems for minimizing the increase in current upon a rise of the water level above the shorter legs of the "J," as also discussed in my prior U.S. Pat. No. 3,619,559. For the sake of structural rigidity, the metal strips forming these electrodes are curved about their longitudinal centerlines throughout their lengths; the curvatures of the stems are relatively inverted, as indicated at 221', 222', while the bight portions are curved in the same sense as the adjoining stems of the opposite electrodes, as indicated at 221'', 222''.

I claim:

1. A steam generator comprising a heating chamber with an inlet and an outlet, a reservoir, a capillary conduit of polytetrafluoroethylene extending from said reservoir to said inlet for supplying water to said chamber at a controlled rate consistent with the rate of steam discharge through said outlet, and electrode means in said chamber connectable to a source of current for vaporizing the water therein, said conduit having a bore of a maximum diameter of substantially ⅛ inch and a length corresponding to a minimum resistance on the order of $10^5$ ohms in a column of water within said bore.

2. A steam generator as defined in claim 1 wherein said boiling chamber is an upward vessel of dielectric material, said electrode means being a pair of conductors suspended from the top of said vessel.

3. A steam generator as defined in claim 2 wherein said pair of conductors have curved lower ends terminating in nested, spaced-apart relationship above said inlet.

* * * * *